(12) United States Patent
Tomie et al.

(10) Patent No.: US 10,714,046 B2
(45) Date of Patent: Jul. 14, 2020

(54) DISPLAY DRIVER, ELECTRO-OPTICAL DEVICE, AND ELECTRONIC APPARATUS

(71) Applicant: SEIKO EPSON CORPORATION, Tokyo (JP)

(72) Inventors: Akihiro Tomie, Okaya (JP); Takeshi Nomura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/503,702

(22) Filed: Jul. 5, 2019

(65) Prior Publication Data

US 2020/0013367 A1    Jan. 9, 2020

(30) Foreign Application Priority Data

Jul. 6, 2018    (JP) .................................. 2018-128810

(51) Int. Cl.
| | |
|---|---|
| G09G 3/36 | (2006.01) |
| G02F 1/1333 | (2006.01) |
| G02F 1/1368 | (2006.01) |
| G02F 1/1362 | (2006.01) |

(52) U.S. Cl.
CPC ......... *G09G 3/3696* (2013.01); *G02F 1/1368* (2013.01); *G02F 1/133305* (2013.01); *G02F 1/136286* (2013.01); *G09G 2310/0291* (2013.01); *G09G 2310/0297* (2013.01)

(58) Field of Classification Search
CPC ............ G02F 1/1368; G02F 1/133305; G09G 2310/0297; G09G 2310/0291; G09G 3/3688; G09G 3/3696
See application file for complete search history.

(56) References Cited

U.S. PATENT DOCUMENTS

| | | | |
|---|---|---|---|
| 6,504,520 | B1 | 1/2003 | Osada et al. |
| 2013/0300722 | A1 | 11/2013 | Gyouten et al. |
| 2017/0110041 | A1* | 4/2017 | Watsuda ................. G09G 3/20 |
| 2019/0333457 | A1* | 10/2019 | Liu ...................... G09G 3/3607 |

FOREIGN PATENT DOCUMENTS

| | | |
|---|---|---|
| JP | 2000-122611 A | 4/2000 |
| JP | 2007-249133 A | 9/2007 |
| JP | 2008-129289 A | 6/2008 |
| WO | 2012/102229 A1 | 8/2012 |

\* cited by examiner

*Primary Examiner* — Abbas I Abdulselam
(74) *Attorney, Agent, or Firm* — Oliff PLC

(57) ABSTRACT

A display driver includes a driving circuit, a first switch signal output circuit that outputs a first switch signal group to one end of a switch signal line group coupled to first to N-th demultiplexers, and a second switch signal output circuit that outputs a second switch signal group to the other end of the switch signal line group. The first switch signal output circuit sets an output terminal group of the first switch signal group to a high impedance state in a transition period of a voltage level of a switch signal.

12 Claims, 13 Drawing Sheets

DISPLAY DRIVER, ELECTRO-OPTICAL DEVICE, AND ELECTRONIC APPARATUS

The present application is based on, and claims priority from JP Application Serial Number 2018-128810, filed Jul. 6, 2018, the disclosure of which is hereby incorporated by reference herein in its entirety.

BACKGROUND

1. Technical Field

The disclosure relates to a display driver, an electro-optical device, and an electronic apparatus.

2. Related Art

As a driving method for an electro-optical panel such as a liquid crystal panel, multiplex driving is widely known. Multiplex driving is a method for driving a plurality of data lines on the electro-optical panel in one horizontal scanning period. In multiplex driving, multiplexed image signals need to be separated into data lines. To this end, a display driver outputs to a demultiplexer a switch signal for selecting a data line that supplies data voltage.

JP-A-2007-249133 discloses a technique for inputting a signal input to a sample and hold circuit from one side of the electro-optical panel.

As advances are made in high resolution and high speed driving of the electro-optical panel, the writing time to one pixel is shortened. When the switch signal is input from one side of the electro-optical panel, a signal delay occurs between a first stage and a subsequent stage. In response, a technique for inputting a stable switch signal by using a configuration in which the switch signal is input from both sides of the electro-optical panel is conceivable. However, when the timings of the two switch signals do not match, a short-circuit state temporarily occurs, resulting in the risk that an abnormal current will flow to the circuit device of the display driver.

SUMMARY

An aspect of the disclosure is related to a display driver including a driving circuit provided with first to N-th drive units configured to output first to N-th image signals to first to N-th image signal lines coupled to first to N-th demultiplexers of a demultiplexer circuit of an electro-optical panel, N being an integer of 2 or greater, a first switch signal output circuit configured to output a first switch signal group to one end of a switch signal line group coupled to the first to N-th demultiplexers of the electro-optical panel, and a second switch signal output circuit configured to output a second switch signal group to the other end of the switch signal line group. An i-th drive unit of the first to N-th drive units of the driving circuit is configured to output, to an i-th image signal line of the first to N-th image signal lines, an i-th image signal obtained by time-division multiplexing a plurality of image signals corresponding to a plurality of data lines of the electro-optical panel, i being an integer of $1 \leq i \leq N$. An i-th demultiplexer of the first to N-th demultiplexers includes a plurality of switching elements coupled to the switch signal line group, and is configured to distribute each of the plurality of image signals time-division multiplexed into the i-th image signal to a corresponding data line among the plurality of data lines. The first switch signal output circuit is configured to set an output terminal group of the first switch signal group to a high impedance state in a transition period of a voltage level of a switch signal of the first switch signal group.

BRIEF DESCRIPTION OF THE DRAWINGS

The disclosure will be described with reference to the accompanying drawings, wherein like numbers reference like elements.

DESCRIPTION OF EMBODIMENTS

Embodiments of the disclosure will be described in detail hereinafter. Note that the embodiments described hereinafter are not intended to limit the content of the disclosure as set forth in the claims, and not all of the configurations described in the embodiments are absolutely required to address the issues described in the disclosure.

1. Display Driver, Electro-Optical Panel

Figure 1:
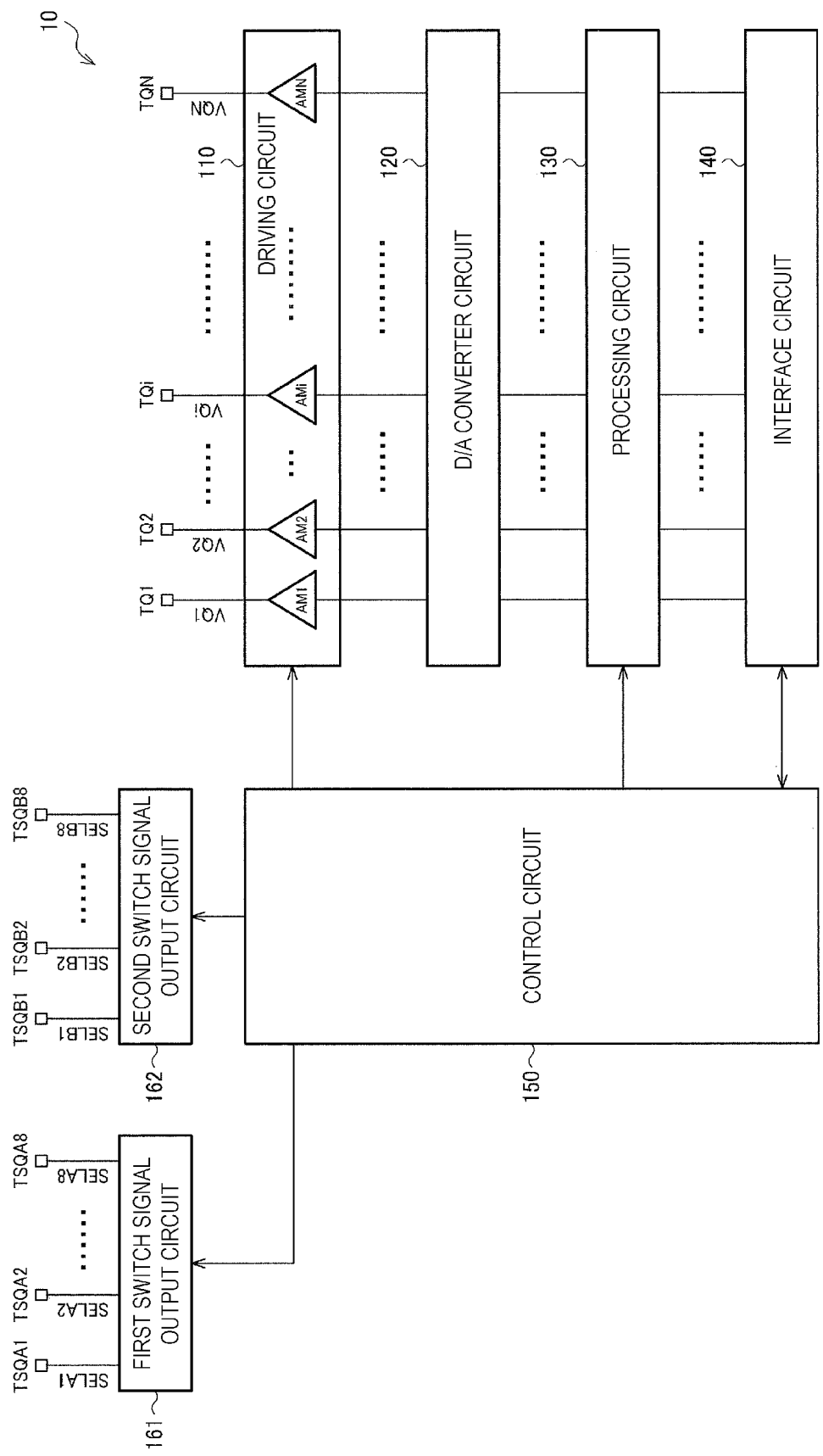
FIG. 1 illustrates a configuration example of a display driver.

FIG. 1 illustrates a configuration example of a display driver 10. The display driver 10 includes a driving circuit 110, a first switch signal output circuit 161, and a second switch signal output circuit 162. Furthermore, the display driver 10 may include a digital-analog (D/A) converter circuit 120, a processing circuit 130, an interface circuit 140, a control circuit 150, image signal output terminals TQ1 to TQN, an output terminal group TSQA1 to TSQA8 to which a first switch signal group is output, and output terminals TSQB1 to TSQB8 to which a second switch signal group is output. Here, the letter "N" represents an integer of 2 or greater, and is 80, for example.

The interface circuit 140 performs communication between an external processing device of the display driver 10 and the display driver 10. The processing device is, for example, a central processing unit (CPU), a microprocessing unit (MPU), a display controller and the like. The interface circuit 140 receives display data sent by the processing device, receives setting data sent by the processing device, and sends various data to the processing device. The display data is image data or gradation data. The setting data is, for example, register setting values, commands and the like. The data sent to the processing device is, for example, register readout data. As the communication scheme of the interface circuit 140, for example, a serial peripheral interface (SPI) scheme, an inter-integrated circuit (I2C) scheme, a low voltage differential signaling (LVDS) scheme, or an RGB serial interface scheme can be used.

The processing circuit 130 carries out data processing on the display data received by the interface circuit 140, and outputs the processed display data to the D/A converter circuit 120. For example, the processing circuit 130 carries out multiplex processing on the display data. That is, the processing circuit 130 latches the display data of one line and outputs time-divided display data items of the pixels corresponding to the multiplex number during one horizontal scanning period. "Multiplex number" refers to the number of pixels driven by one amplifying circuit in one horizontal scanning period. In the example in FIG. 1, the multiplex number is 8, but is not limited thereto. Additionally, the processing circuit 130 may carry out processing such as gamma correction processing, white-balance correction processing, or frame rate control (FRC) processing on the display data. Further, the processing circuit 130 is achieved by a logic circuit configured by automatic arrangement wiring, such as a gate array.

The D/A converter circuit 120 D/A-converts the time-divided display data of pixels output by the processing circuit 130 and outputs time-divided gradation voltages corresponding to the time-divided display data of the pixels. The D/A converter circuit 120 is constituted by a voltage generator circuit that is configured to generate multiple voltages and a voltage selector circuit that is configured to select a voltage corresponding to the display data of the pixels among the multiple voltages. The voltage generator circuit is, for example, a ladder resistor circuit, and the voltage selector circuit is, for example, a selector constituted by switches.

The driving circuit 110 amplifies the time-divided gradation voltages from the D/A converter circuit 120 and outputs data voltages that are the amplified gradation voltages as voltages VQ1 to VQN. In detail, the driving circuit 110 includes amplifier circuits AM1 to AMN, where an amplifier circuit AMi outputs a voltage VQi. Here, the letter "i" represents an integer from 1 to N, inclusive. The voltage VQi is output from an image signal output terminal TQi to an image signal input terminal of an electro-optical panel. The amplifier circuit AMi is, for example, a voltage follower circuit. In such a case, the amplifier circuit AMi includes an operational amplifier, in which the output node and the inverting input node of the operational amplifier are coupled, and the non-inverting input node of the operational amplifier receives a gradation voltage. The inverting input node is a negative polarity input node, and the non-inverting input node is a positive polarity input node. Alternatively, the amplifier circuit AMi may be an inverting amplifier circuit. In such a case, the amplifier circuit AMi includes an operational amplifier, a resistor disposed between the node receiving the gradation voltage and the non-inverting input node of the operational amplifier, and a resistor coupled in between the output node and the inverting input node of the operational amplifier.

The control circuit 150 carries out various control processes for each component of the display driver 10. In detail, the control circuit 150 carries out timing control of the driving of the electro-optical panel based on the display data and timing control signals received via the interface circuit 140. Furthermore, the control circuit 150 carries out operation setting and the like of each component of the display driver 10 based on setting information and commands received via the interface circuit 140. For example, the control circuit 150 controls the timing of multiplex processing of the display data by the processing circuit 130, and performs timing control of output of switch signals SELA1 to SELA8 by a first switch signal output circuit 161, and timing control of output of switch signals SELB1 to SELB8 by the second switch signal output circuit 162. The switch signals SELA1 to SELA8 and the switch signals SELB1 to SELB8 are switch control signals that control the on/off of a switching element.

Figure 2:
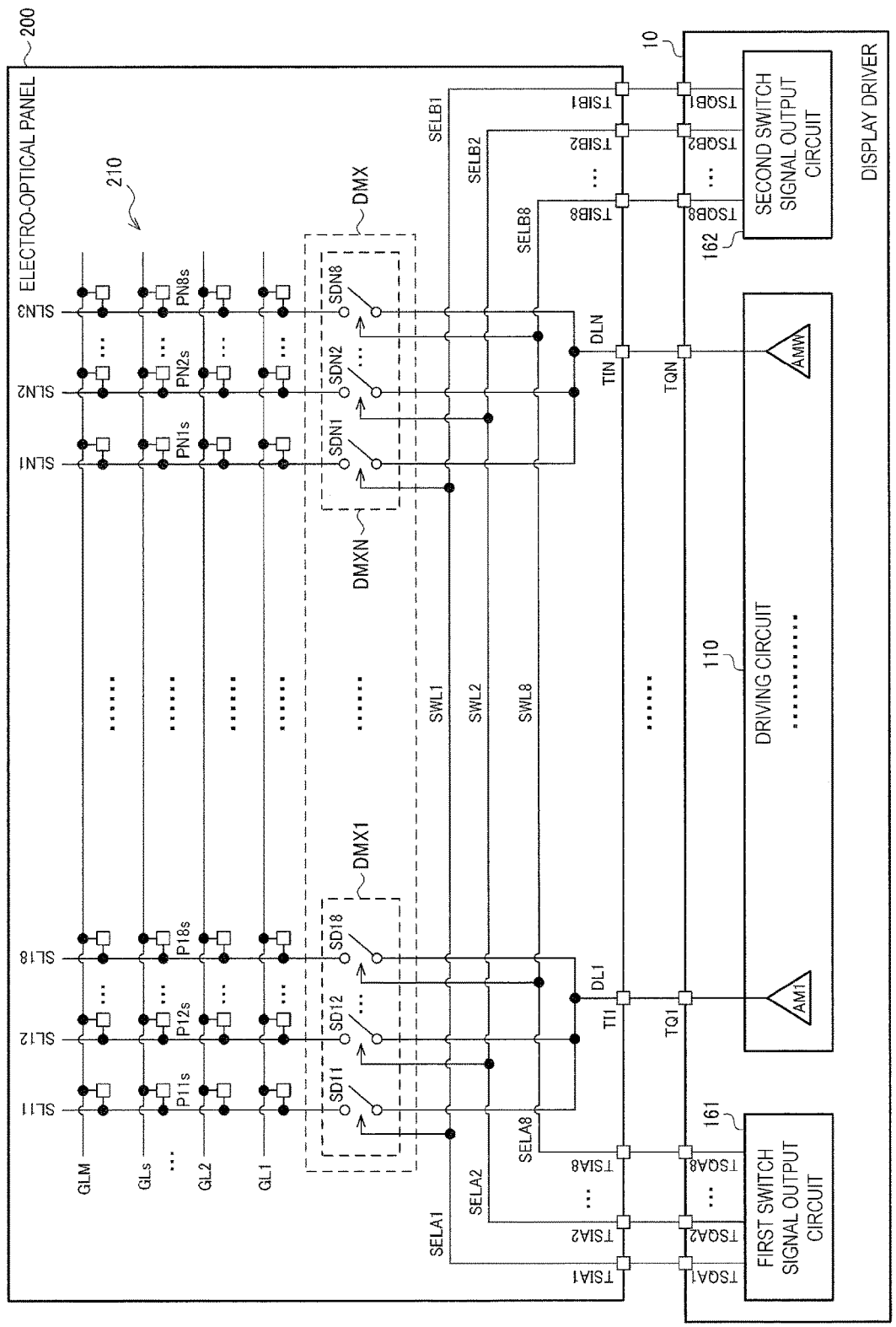
FIG. 2 illustrates a configuration example of an electro-optical panel, and a coupling example of the electro-optical panel and the display driver.

The first switch signal output circuit 161 outputs the switch signals SELA1 to SELA8 that control the on/off of SD11 to SD18 and SDN1 to SDN8 in FIG. 2 serving as switching elements of the demultiplexer of the electro-optical panel. Specifically, the first switch signal output circuit 161 outputs the switch signals SELA1 to SELA8 to one end of a switch signal line group SWL1 to SWL8 coupled to the demultiplexer.

The second switch signal output circuit 162 outputs the switch signals SELB1 to SELB8 that control the on/off of the switching elements of the demultiplexer of the electro-optical panel. Specifically, the second switch signal output circuit 162 outputs switch signals SELB1 to SELB8 to the other end of the switch signal line group coupled to the demultiplexer. A switch signal SELAj is output from TSQAj, which is a terminal included in the output terminal group of the first switch signal group, to TSIAj in FIG. 2, which is a terminal included in the first switch signal input terminal group of the display panel. The switch signal SELBj is output from TSQBj, which is a terminal included in the output terminal group of the second switch signal group, to TSIBj in FIG. 2, which is a terminal included in the second switch signal input terminal group of the display panel. The letter "j" represents an integer from 1 to 8, inclusive.

FIG. 2 illustrates a configuration example of an electro-optical panel 200 driven by the display driver 10. The electro-optical panel 200 includes the switch signal line group SWL1 to SWL8, image signal lines DL1 to DLN, a demultiplexer circuit DMX, and a pixel area 210. The pixel area 210 includes scanning lines GL1 to GLM, data lines SL11 to SL18, . . . SLN1 to SLN8, and a plurality of pixels. The letter "M" represents an integer of 2 or greater. In the example in FIG. 2, the pixel area 210 includes (8×N)×M pixels. For example, N=80 and M=480, and the pixel area 210 includes a pixel array having a size of 640×480. It should be noted that the size of the pixel array is not limited thereto.

One demultiplexer is constituted by eight switches. Specifically, demultiplexer DMX1 is constituted by the switches SD11 to SD18 The switch SD11 is provided between the image signal line DL1 and the data line SL11. Similarly, the switches SD12 to SD18 are provided between the image signal line DL1 and the data lines SL12 to SL18, respectively. The switches SD11 to SD18 are transistors, such as thin film transistors (TFT). Taking a scanning line GLs as an example, a pixel P11s is coupled to the scanning line GLs and the data line SL11. The letter "s" represents an integer from 1 to M, inclusive. Similarly, the pixels P12s to P18s are coupled to the scanning line GLs and the data lines SL12 to SL18, respectively. Each pixel includes, for example, a liquid crystal cell and a TFT. The source of the TFT is coupled to the data line, the drain is coupled to the liquid crystal cell, and the gate is coupled to the scanning line. The same applies to the portions related to TI2 to TIN.

2. Multiplex Driving

In the related art, a display driver 10 is known that outputs a switch signal group from only one end of the switch signal line group of the electro-optical panel 200 and does not output a switch signal group from the other end side.

Figure 3:
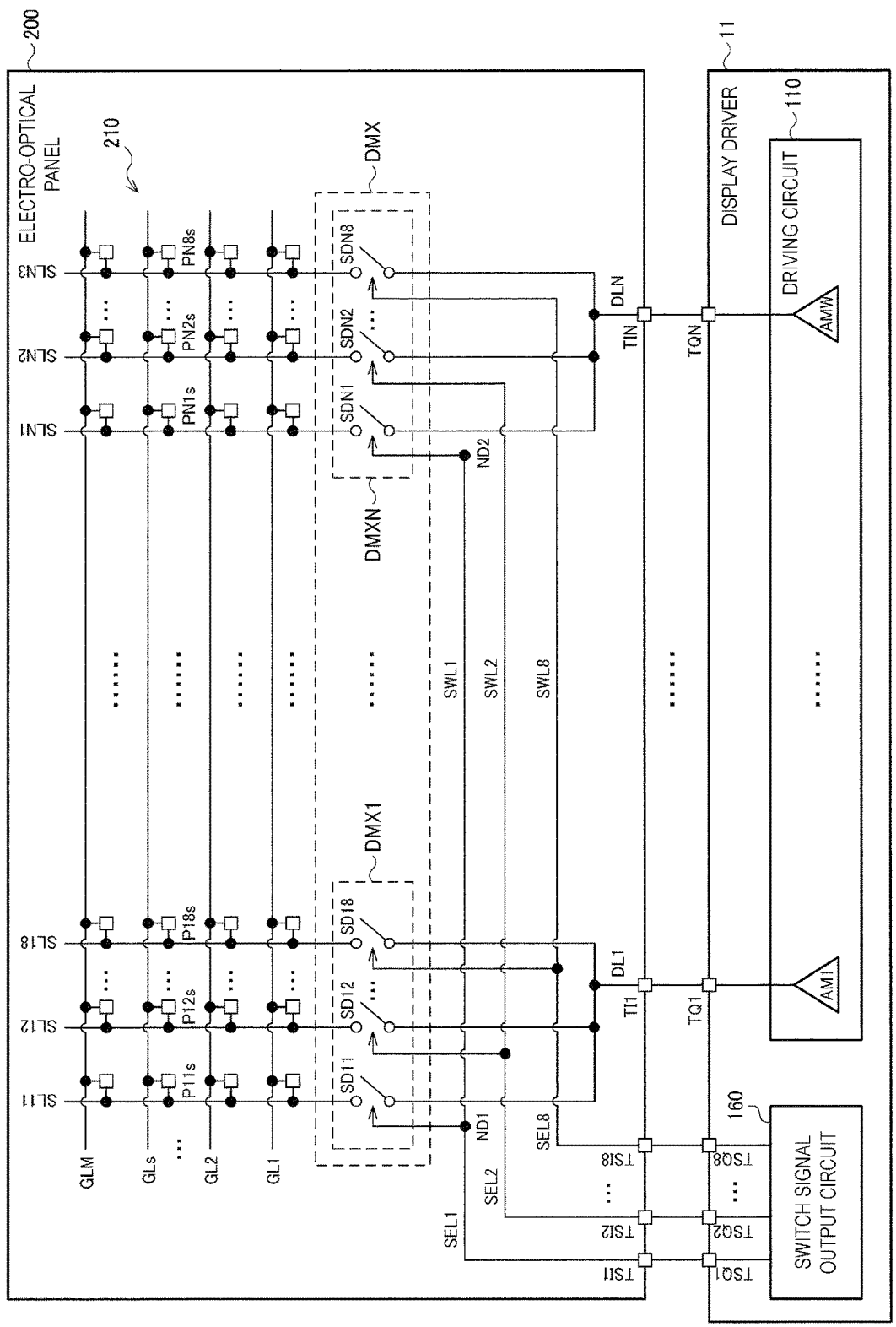
FIG. 3 illustrates a coupling example of the electro-optical panel and the display driver in a comparative example.

FIG. 3 is a configuration example of a display driver 11 and the electro-optical panel 200 in a comparative example in which a switch signal group is output to one end of a switch signal line group. Note that the components of the electro-optical panel 200 that are the same as those in FIG. 2 are denoted using the same reference numerals. The display driver 11 in the comparative example includes the switch signal output circuit 160. The switch signal output circuit 160 outputs the switch signals SEL1 to SEL8 that control the on/off of the switches of the demultiplexer.

Figure 4:
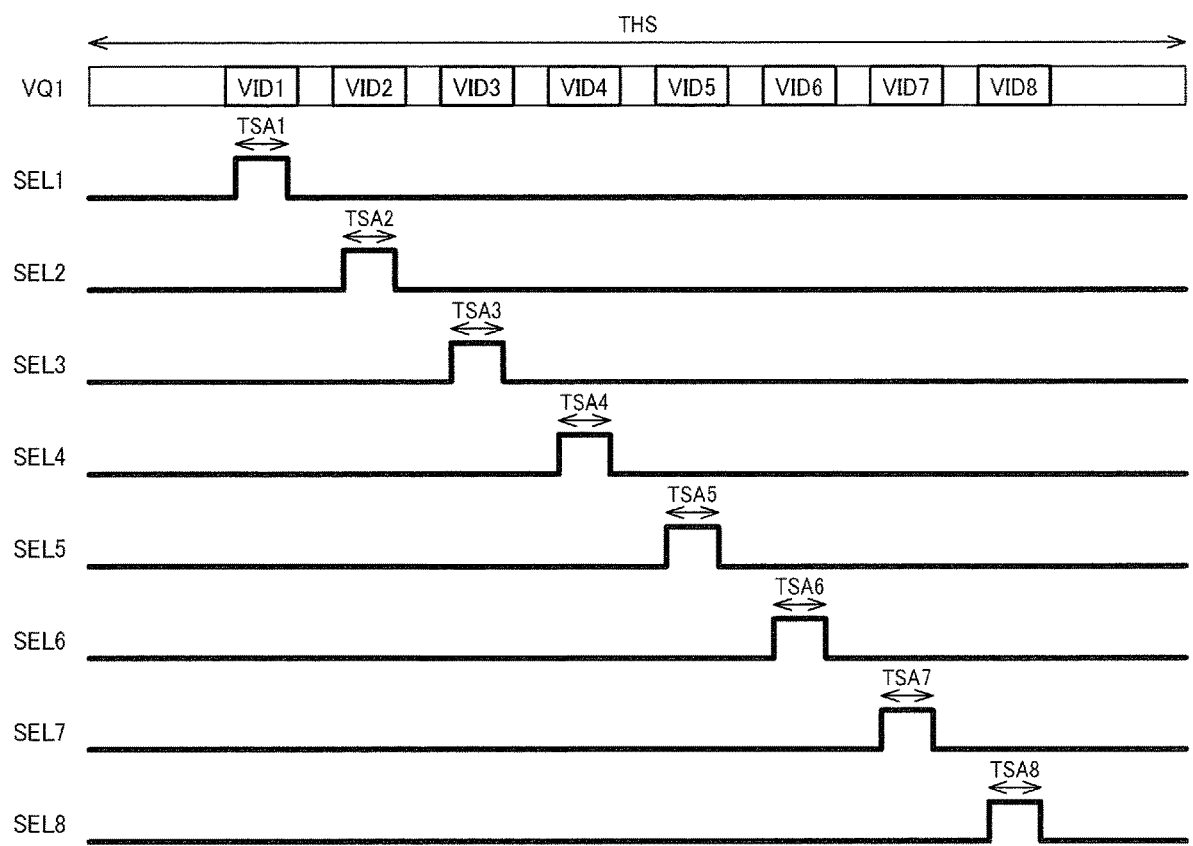
FIG. 4 illustrates a timing chart for explaining multiplex driving in the comparative example.

FIG. 4 is a timing chart for explaining an example of the multiplex driving when the display driver 11 of the configuration illustrated in FIG. 3 is used. The display driver 11 writes data voltages in the pixels in a horizontal scanning period THS. Note that FIG. 4 exemplifies the voltage VQ1 output by the amplifier circuit AM1. The switch signal output circuit 160 outputs the active switch signal SEL1, and the amplifier circuit AM1 outputs a data voltage VID1, in a driving period TSA1. The data voltage VID1 is a voltage of an image signal corresponding to the display data of the pixel P11s. The switch signals SEL2 to SEL8 are inactive in the driving period TSA1. Note that "active" refers to a first logic level that is a logic level that turns on the switch, and inactive is a second logic level that is a logic level that turns off the switch.

Similarly, the switch signal output circuit 160 outputs the active switch signals SEL2 to SEL8, and the amplifier circuits AM1 outputs data voltages VID2 to VID8, in driving periods TSA2 to TSA8, respectively.

In this way, appropriate switch control based on the switch signals SEL1 to SEL8 is considered possible. However, in recent years, advances have been made in high resolution and high speed driving in relation to the electro-optical panel 200. Because the load increases due to the increased number of elements, the waveform of the switch signal becomes dull to deteriorate writing performance, and delay the timing of the switch signal. With the writing time to one pixel decreasing as advances are made in high resolution and high speed driving, the effect of the deterioration in writing performance and the delay in timing is significant.

Figure 5:
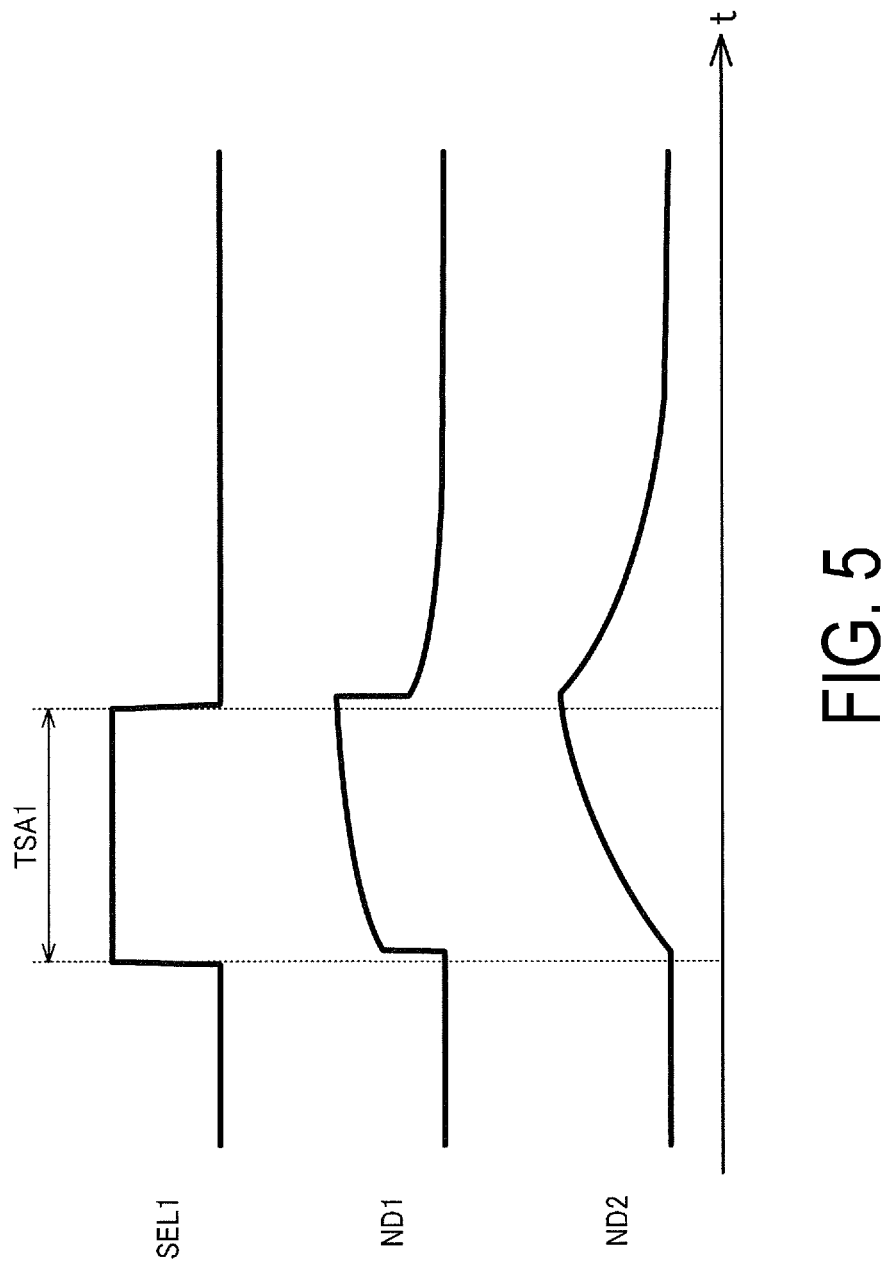
FIG. 5 illustrates a waveform diagram for explaining a problem of the comparative example.

FIG. 5 is a waveform diagram describing the change over time of the switch signal SEL1, which is the output of the switch signal output circuit 160, the voltage value at ND1, and the voltage value at ND2 in FIG. 3. The switch signal SEL1 is active in the driving period TSA1 and is inactive in other periods.

As can be seen from the waveform illustrated by ND1 and ND2 in FIG. 5, as the waveform advances from the input side to a subsequent stage, the timings of the rise and fall of the signal are delayed compared to those of the switch signal SEM. Additionally, as the waveform advances from the input side to a subsequent stage, changes in the voltage value at the rise and the fall become more gradual. Here, within the switch signal line SWL1, the input side refers to a side of the switch signal line SWL1 close to the switch signal input terminal TSI1, and the subsequent stage side refers to a side away from the switch signal input terminal. For ND1 and ND2 in FIG. 3, ND1 is the input side, and ND2 is the subsequent stage side of ND1.

As a result, a period in which the switch SD11 is not turned on may occur when the amplifier circuit AM1 is outputting the data voltage VID1, for example. Alternatively, a period in which the switch SD11 remains on may occur even when the amplifier circuit AM1 has transitioned to output of the data voltage VID2. That is, appropriate control is difficult due to the deterioration in writing performance and the delay in signal timing. As described above, as more advances are made in the high resolution of the electro-optical panel 200, the deterioration in writing performance and the delay in signal timing become increasingly significant on the subsequent stage side.

The deterioration in writing performance and the delay in signal timing can be suppressed by improving a drive capacity of the switch signal output circuit 160. However, improving the drive capacity results in an increase in size of the switch signal output circuit 160. For example, to improve the drive capacity, the size of the transistor constituting the buffer circuit of the switch signal output circuit 160 needs to be increased.

In this respect, the display driver 10 according to the embodiment includes the driving circuit 110, the first switch signal output circuit 160, and the second switch signal output circuit 162, as illustrated in FIG. 1.

The driving circuit 110 includes first to N-th drive units that are configured to output first to N-th image signals VQ1 to VQN to first to N-th image signal lines DI1 to DIN coupled to first to N-th demultiplexers DMX1 to DMXN of the demultiplexer circuit DMX included in the electro-optical panel 200. The first to N-th drive units correspond to the amplifier circuits AM1 to AMN.

An i-th ($1 \leq i \leq N$) drive unit of the first to N-th drive units of the driving circuit 110 outputs the i-th image signal VQi in which a plurality of image signals corresponding to a plurality of data lines of the electro-optical panel 200 are time-division multiplexed to the i-th image signal line DLi of the first to N-th image signal lines DL1 to DLN. Specifically, the amplifier circuit AMi outputs the image signal VQi in which the image signals VID1 to VID8 of eight pixels are time-division multiplexed to the image signal line DLi.

The first switch signal output circuit 161 outputs the first switch signal group to one end of the switch signal line group coupled to the first to N-th demultiplexers of the electro-optical panel 200. The second switch signal output circuit 162 outputs the second switch signal group to the other end of the switch signal line group. The switch signal line group here corresponds to SWL1 to SWL8. The first switch signal group corresponds to SELA1 to SELA8, and the second switch signal group corresponds to SELB1 to SELB8.

Here, the i-th demultiplexer of the first to N-th demultiplexers includes a plurality of switching elements coupled to the switch signal line, and distributes each of the plurality of image signals time-division multiplexed into the i-th image signal to the corresponding data lines of the plurality of data lines. For example, the demultiplexer DMX1 includes switching elements SD11 to SD18 coupled to switch signal line group SWL1 to SWL8, and distributes each of the plurality of image signals VID1 to VID8 time-division multiplexed into the first image signal VQ1 to the corresponding data lines SL11 to SL18.

Figure 6:
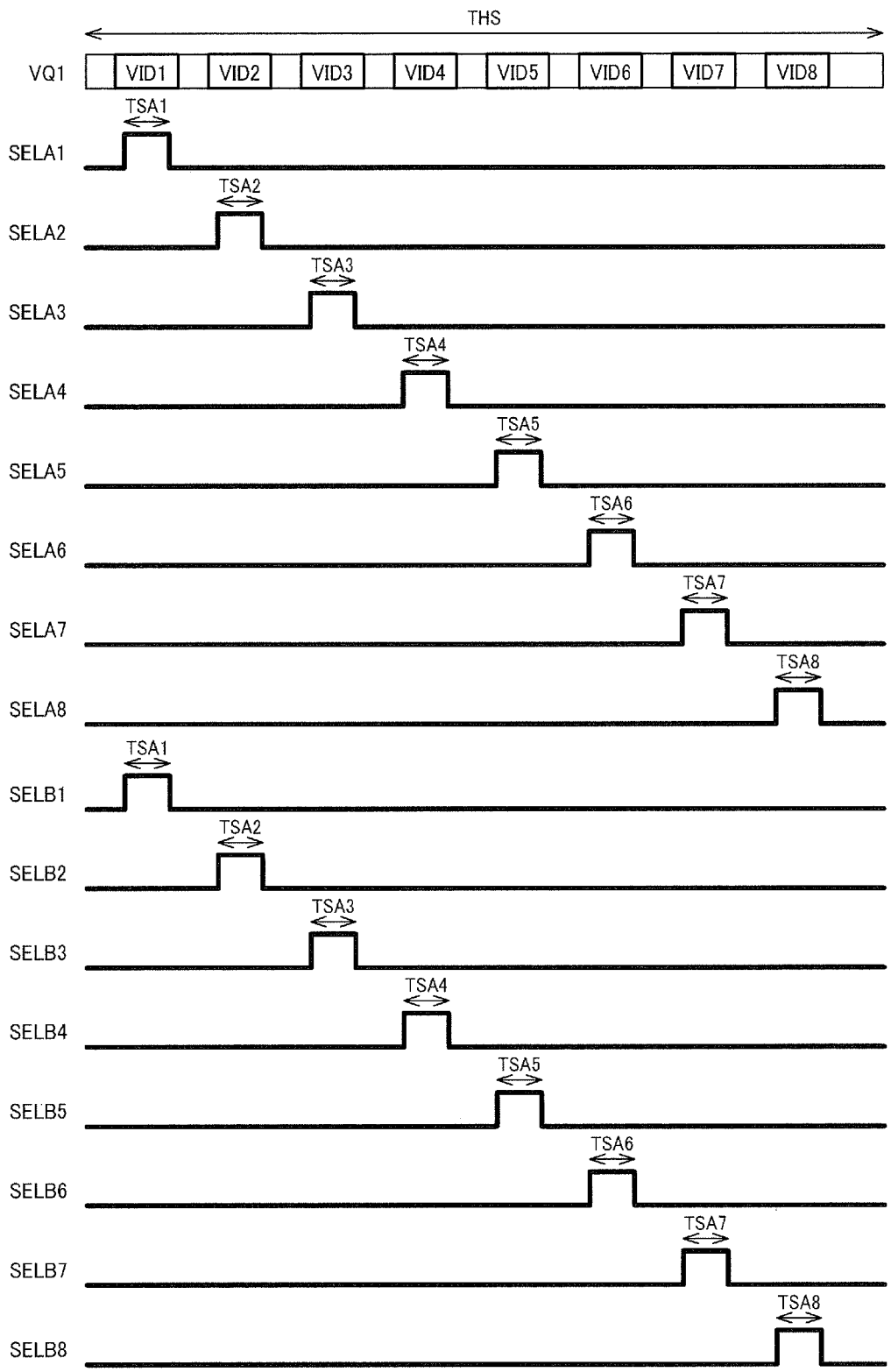
FIG. 6 illustrates a timing chart for explaining multiplex driving according to an exemplary embodiment.

FIG. 6 is a timing chart representing an example of a switch signal for appropriate distribution of the image signals to each data line. Note that FIG. 6 exemplifies the voltage VQ1 output by the amplifier circuit AM1, similar to FIG. 4. The amplifier circuit AM1 outputs the data voltage VID1 in the driving period TSA1. Then, in the driving period TSA1, the first switch signal output circuit 161 outputs the active switch signal SELA1, and the second switch signal output circuit 162 outputs the active switch signal SELB1. The switch signals SELA2 to SELA8 and the switch signals SELB2 to SELB8 are inactive in the driving period TSA1.

Similarly, in the driving periods TSA2 to TSA8, the amplifier circuit AM1 outputs the data voltages VID2 to VID8, the first switch signal output circuit 161 outputs the active switch signals SELA2 to SELA8, and the second switch signal output circuit 162 outputs the active switch signals SELB2 to SELB8.

In this way, switch control can be performed using two switch signal output circuits. Because the load is dispersed, even when the high resolution of the electro-optical panel 200 is advanced, it is possible to suppress the deterioration in writing performance and the delay in signal timing.

However, when a switch signal is input from both ends of the switch signal line, new problems arise that are not present in the comparative example described with reference to FIG. 3 to FIG. 5. Specifically, there is a risk of a short-circuit state due to the fact that a shift occurs in the timings of the first switch signal group and the second switch signal group. For the sake of simplicity, the relationship between SELA1 and SELB1 is described below, but this same relationship exists between SELA2 to SELA8 and SELB2 to SELB8, respectively.

As will be described in detail below with reference to FIG. 11 and the like, the first switch signal output circuit 161 outputs the switch signal SELA1 based on the input signal IN1, and the second switch signal output circuit 162 outputs the switch signal SELB1 based on the input signal. Here, the input signal for generating SELA1 and the input signal for generating SELB1 are different signals. Therefore, it is not easy to exactly match the timings of the two input signals, and a difference in timings occurs due to, for example, an internal delay in the display driver 10 or the like. When a shift occurs in the timing of the input signal, a shift also occurs in the timings of SELA1, which is the output of the first switch signal output circuit 161, and SELB1, which is the output of the second switch signal output circuit 162.

Figure 7:
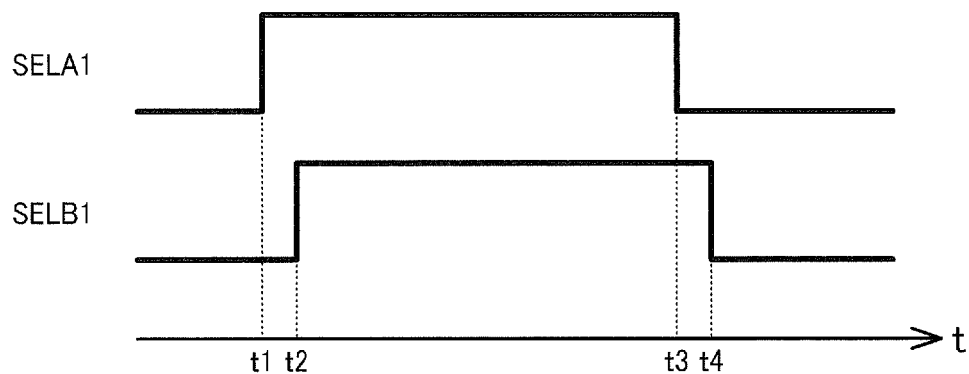
FIG. 7 illustrates a waveform diagram when timings of two switch signals do not match.

FIG. 7 is a signal waveform diagram when the timings of SELA1 and SELB1 are shifted. In the example in FIG. 7, SELA1 rises at the timing of t1, while SLEB1 rises at the timing of t2, which is later than t1. Thus, in the period of t1 to t2, SELA1 is active and SELB1 is inactive. Further, SELA1 falls at the timing of t3, while SLEB1 falls at the timing of t4, which is later than t3. Thus, in the period of t3 to t4, SELA1 is inactive and SELB1 is active. In this way, when the timings of SELA1 and SELB1 do not match, a short-circuit state may occur, which may cause failure.

Figure 8:
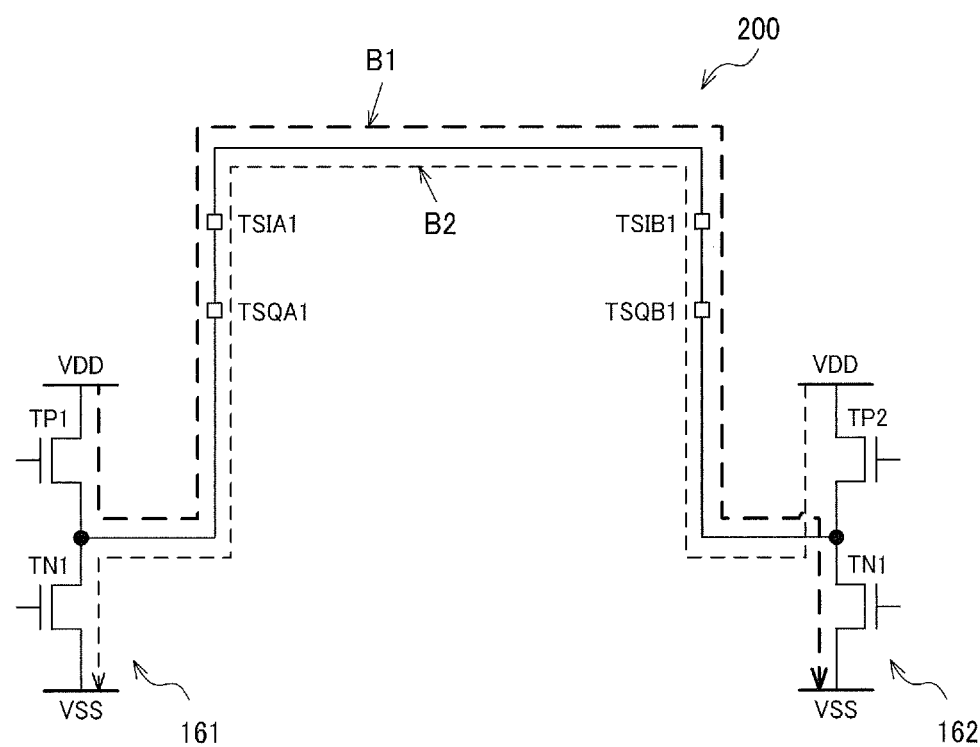
FIG. 8 illustrates an explanatory drawing of a short-circuit state.

FIG. 8 is an explanatory drawing of the short-circuit state. Note that, in FIG. 8, only a portion of the first switch signal output circuit 161 is illustrated. Specifically, FIG. 8 illustrates a P-type transistor TP1 provided between the high electric potential side power supply VDD and the output terminal TSQA1, and an N-type transistor TN1 provided between the output terminal TSQA1 and the low electric potential side power supply VSS. The P-type transistor TP1 and the N-type transistor TN1 are transistors that constitute, for example, a buffer circuit. For the second switch signal output circuit 162 as well, FIG. 8 illustrates the P-type transistor TP2 and the N-type transistor TN2.

As indicated by t1 to t2 in FIG. 7, when SELA1 is active and SELB1 is inactive, the P-type transistor TP1 of the first switch signal output circuit 161 is in the on-state and the N-type transistor TN2 of the second switch signal output circuit 162 is in the on-state. Thus, in the period of t1 to t2, a large current flows from the high electric potential side VDD to the low electric potential side power supply VSS by a path indicated by B1.

Further, as indicated by t3 to t4 in FIG. 7, when SELA1 is inactive and SELB1 is active, the N-type transistor TN1 of the first switch signal output circuit 161 is in the on-state and the P-type transistor TP2 of the second switch signal output circuit 162 is in the on-state. Thus, in the period of t3 to t4, a large current flows from the high electric potential side VDD to the low electric potential side power supply VSS by a path indicated by B2.

In particular, the P-type transistors TP1, TP2 and the N-type transistors TN1, TN2 illustrated in FIG. 8 are presumably large in size to increase drive capacity, and thus have a significant impact when in a short-circuit state.

Here, in the transition period of the voltage level of the switch signals of the first switch signal group, the first switch signal output circuit 161 of the embodiment sets the output terminal group of the first switch signal group to a high impedance state.

Here, the high impedance state represents a state in which the output terminal group TSQA1 to TSQA8 of the first switch signal group is not coupled to the power supply. Note that the technique of the embodiment may be considered a technique that allows the first switch signal output circuit 161 to switch the state of the switch signal using the three states of active, inactive, and high impedance. According to the technique of the embodiment, it is possible to realize a state in which terminals on one side of the output terminal group of the switch signal are not coupled to the power supply in a period including a period in which a short-circuit state may occur, such as t1 to t2 or t3 to t4 in FIG. 7. As a result, occurrence of the short-circuit state can be suppressed. Specifically, the current from the power supply on one side of the first switch signal output circuit 161 and the second switch signal output circuit 162 can be suppressed from flowing to the power supply on the other side via the output terminal of the first switch signal output circuit 161.

The first switch signal output circuit 161 sets the output terminal group of the first switch signal group to the high impedance state in a first transition period when a voltage level of a switch signal of the first switch signal group transitions from a first voltage level to a second voltage level, and in a second transition period when a voltage level of a switch signal of the first switch signal group transitions from the voltage level of 2 to the first voltage level.

The first voltage level corresponds to a logic level that, for example, turns off the switch, and the second voltage level corresponds to a logic level that turns on the switch. According to the technique of the embodiment, the switch signal of the first switch signal group transitions from inactive to a high impedance state, and to active. Similarly, the switch signal of the first switch signal group transitions from active to a high impedance state, and to inactive.

Then, the second switch signal output circuit 162 transitions the voltage level of the switch signal of the second switch signal group from the first voltage level to the second voltage level in the first transition period of the first switch signal output circuit 161. Further, the second switch signal output circuit 162 transitions the voltage level of the switch signal of the second switch signal group from the second voltage level to the first voltage level in the second transition period of the first switch signal output circuit 161.

Figure 9:
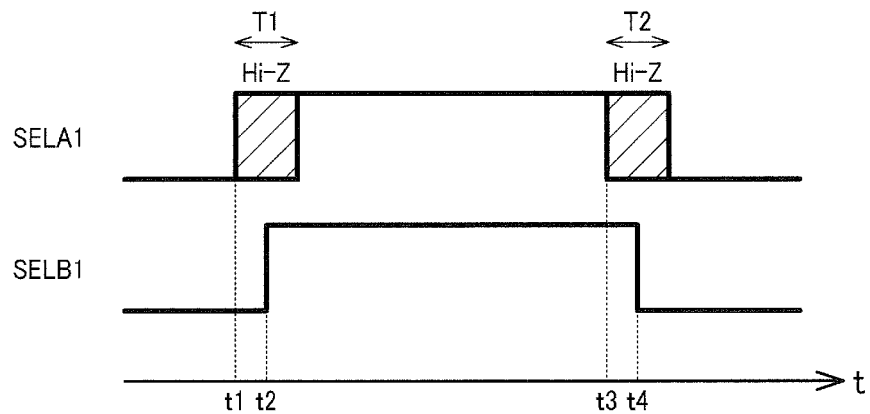
FIG. 9 illustrates a timing chart for explaining a technique in the embodiment.

FIG. 9 is a timing chart for explaining SELA1 and SELB1 in the technique of the embodiment. As illustrated in FIG. 9, when transitioning from inactive to active, SELA1 enters the high impedance state in a first transition period T1. Further, when transitioning from active to inactive, SELA1 enters the high impedance state in a second transition period T2. In addition, SELB1 transitions from inactive to active at the timing of t2 in the first transition period T1, and transitions from active to inactive at the timing of t4 in the second transition period T2.

In this way, the occurrence of a state in which one of SELA1 and SELB1 is active and the other is inactive can be suppressed. In other words, it is possible to suppress the occurrence of a short-circuit state.

3. Switch Signal Output Unit

As illustrated in FIG. 9, in addition to the active/inactive control of the switch signal, the first switch signal output circuit 161 of the embodiment needs to perform control processing for setting the output terminal group TSQA1 to TSQA8 to the high impedance state. Hereinafter, a configuration of the first switch signal output circuit 161 for outputting the switch signals illustrated in FIG. 9 will be described in detail.

Figure 10:
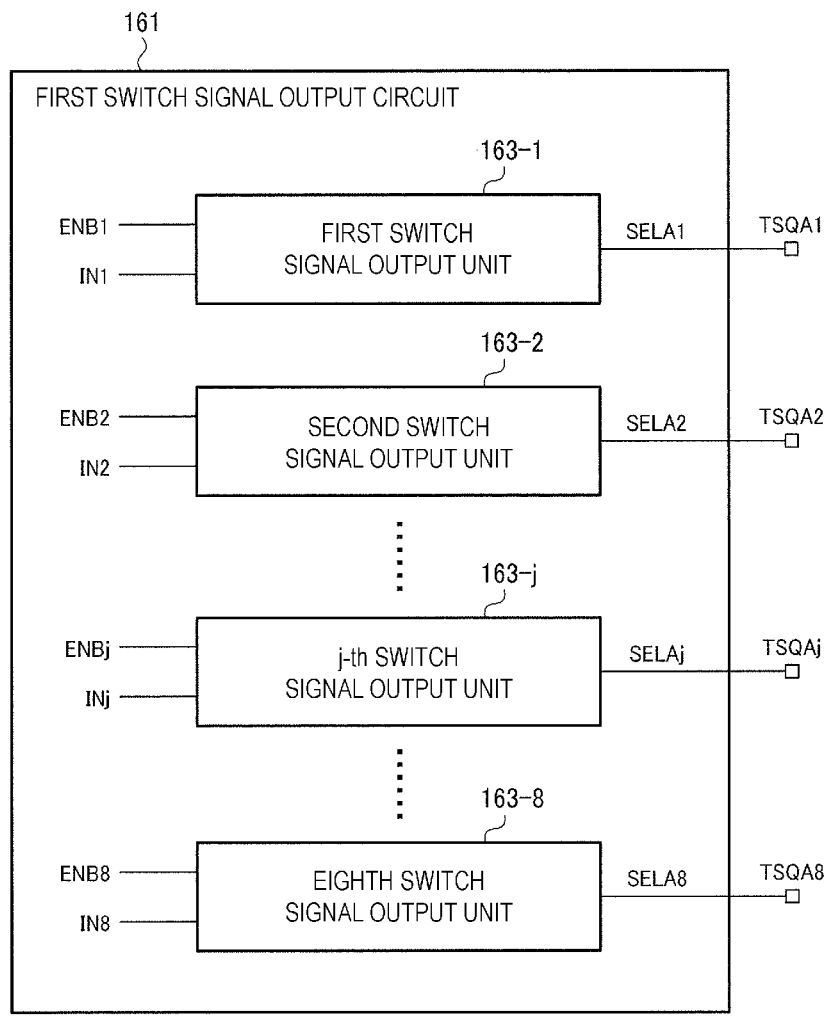
FIG. 10 illustrates a configuration example of a first switch signal output circuit.

FIG. 10 is diagram illustrating a configuration example of the first switch signal output circuit 161. The first switch signal output circuit 161 includes first to K-th switch signal output units that are configured to output first to K-th switch signals, which constitute the first switch signal group, to first to K-th output terminals, which constitute an output terminal group. For example, K=8 and, as the first to K-th switch signal output units, FIG. 10 exemplifies first to eighth switch signal output units 163-1 to 163-8. Further, the first to K-th switch signals correspond to SELA1 to SELA8. The first to K-th output terminals correspond to TSQA1 to TSQA8.

Then, a j-th (1≤j≤K) switch signal output unit 163-*j* of the first to K-th switch signal output units sets a j-th output terminal TSQA*j* of the first to K-th output terminals to the high impedance state in the transition period.

By providing switch signal output units in correspondence to the number of switch signals, it is possible to individually control active/inactive of the plurality of switch signals SELA1 to SELA8 and to individually control whether or not the plurality of output terminals TSQA1 to TSQA8 are to be set to the high impedance state.

The j-th switch signal output unit 163-*j* receives an input signal IN*j* for generating a j-th switch signal, and a control signal ENB*j*. Here, the control signal ENB*j* becomes active during the first period from a timing at the input signal IN*j* changes from a first input voltage level to a second input voltage level. Here, the first input voltage level is a voltage level corresponding to inactivate of the switch signal SELA*j*, for example, and the second input voltage level is a voltage level corresponding to active of the switch signal SELA*j*. Further, the control signal ENB*j* becomes active during the second period from a timing at the input signal IN*j* changes from the second input voltage level to the first input voltage level. Then, the j-th switch signal output unit 163-*j* sets the j-th output terminal TSQA*j* to the high impedance state in the first period and the second period.

In this way, the active/inactive control of the switch signal SEL*j* and the control of the high impedance state of the output terminal TSQA*j* can be performed based on the input signal IN*j* and the control signal ENB*j*. Specifically, the j-th switch signal output unit 163-*j* sets the output terminal TSQA*j* to the high impedance state when the control signal ENB*j* is active. Additionally, when the control signal ENB*j* is inactive, the j-th switch signal output unit 163-*j* outputs the switch signal SELA*j* set to active/inactive in accordance with the input voltage level of the input signal IN*j*.

Figure 11:
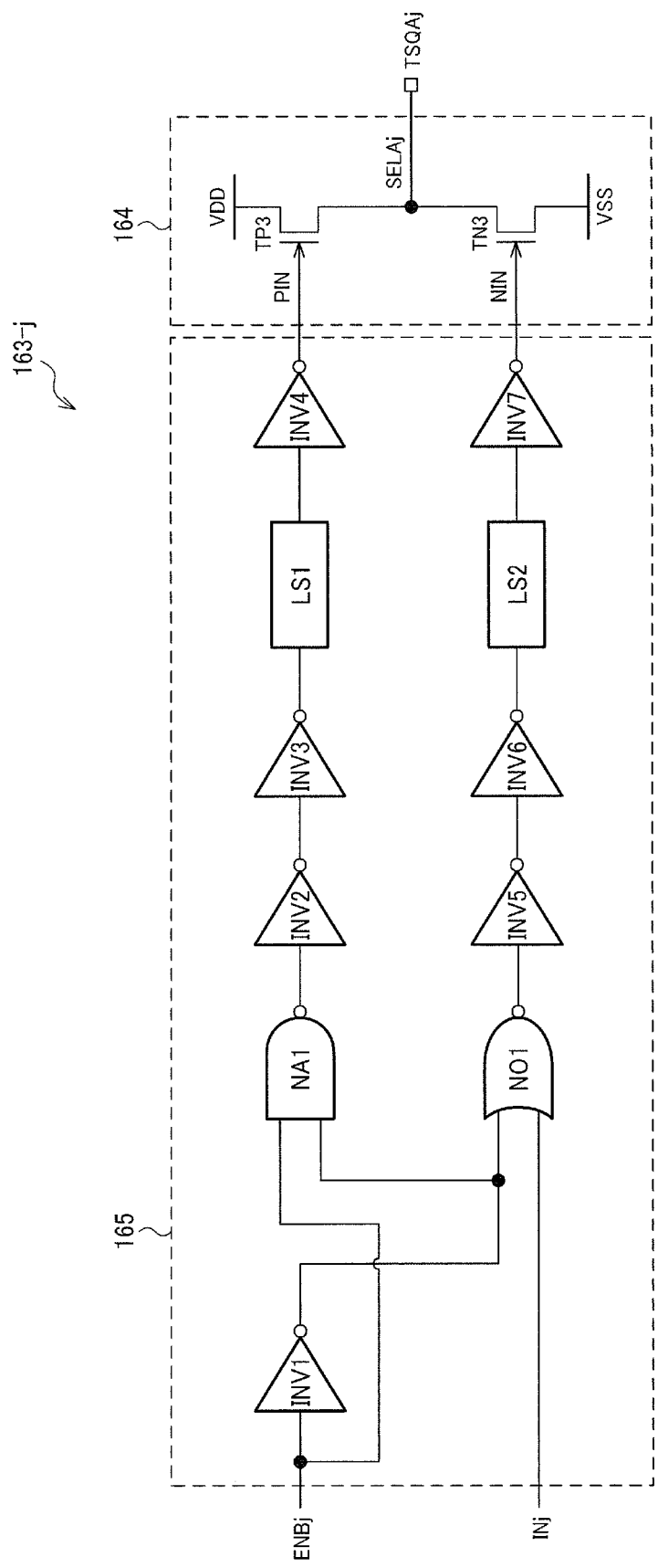
FIG. 11 illustrates a configuration example of a switch signal output unit.

FIG. 11 is diagram illustrating a configuration example of the j-th switch signal output unit 163-*j*. The j-th switch signal output unit 163-*j* includes a buffer circuit 164 and a signal generator circuit 165. The buffer circuit 164 includes a P-type transistor TP3 provided between the high electric potential side power supply VDD and the j-th output terminal TSQA*j*, and an N-type transistor TN3 provided between the j-th output terminal TSQA*j* and the low electric potential side power supply VSS. The signal generator circuit 165 generates a first signal PIN input to the P-type transistor TP3 and a second signal NIN input to the N-type transistor TN3 based on the input signal IN*j* and the control signal ENB*j*.

The signal generator circuit 165 includes an inverter INV1, a NAND circuit NA1, and a NOR circuit NO1. The signal generator circuit 165 may also include inverters INV2 to INV7 and level shifters LS1 and LS2. In the example in FIG. 11, the level shifters LS1 and LS2 shift the voltage level and invert the signal.

The control signal ENB*j* is input to the inverter INV1. The control signal ENB*j* and the input signal IN*j* are input to the NAND circuit NA1. The output of the inverter INV1 and the input signal IN*j* are input to the NOR circuit NO1. The output of the NAND circuit NA1 is input to a gate of the P-type transistor TP3 as the first signal PIN via the inverter INV2, the inverter INV3, the level shifter LS1, and the inverter INV4. The output of the NOR circuit NO1 is input to a gate of the N-type transistor TN3 as the second signal NIN via the inverter INV5, the inverter INV6, the level shifter LS2, and the inverter INV7.

Figure 12:
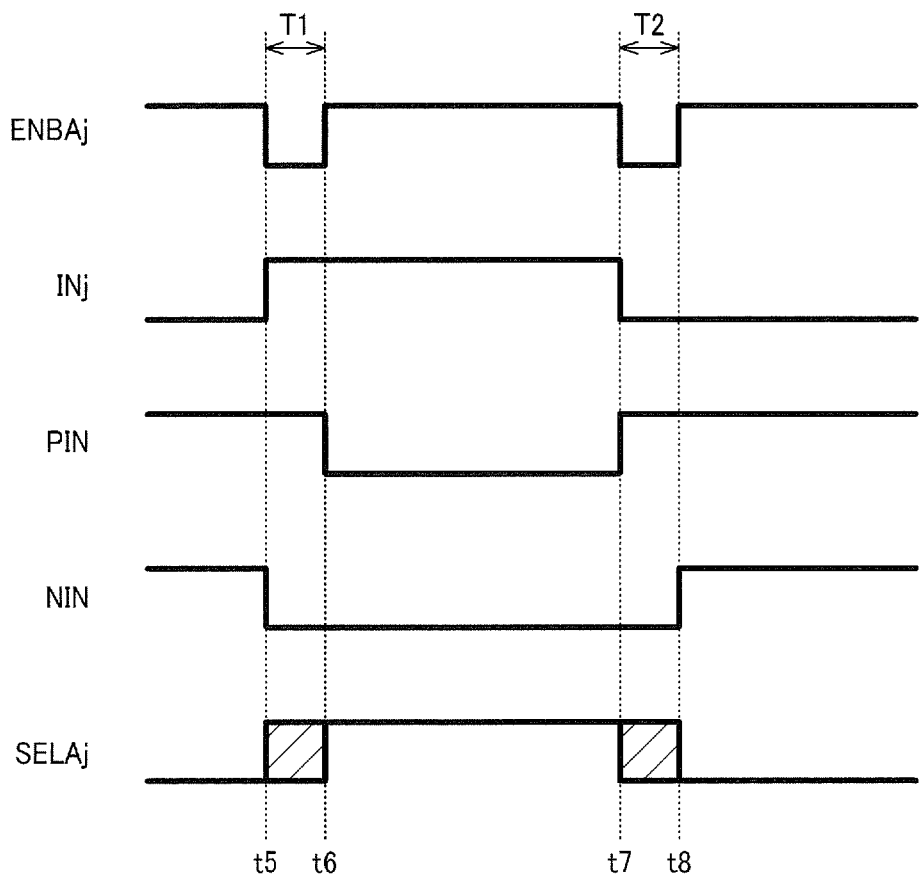
FIG. 12 illustrates a waveform diagram for explaining an operation of a switch signal output unit.

FIG. 12 is a signal waveform diagram for explaining the control signal ENB*j*, the input signal IN*j*, the first signal PIN, the second signal NIN, and the switch signal SELA*j*, which is an output signal. In the configuration in FIG. 11, the control signal ENB*j* is a signal that is at the low level when active and at the high level when inactive.

The input signal IN*j* changes from a first input voltage level to the second input voltage level at t5, and from the second input voltage level to the first input voltage level at t7. The control signal ENB*j* is active during the first period from t5 and during the second period from t7, and is inactive in other periods. Here, the first period corresponds to the first transition period T1 and the second period corresponds to the second transition period T2 illustrated in FIG. 9.

The logic level of the first signal PIN corresponds to the logic level of the output of the NAND circuit NA1. Thus, as illustrated in FIG. 12, the signal generator circuit 165 generates the first signal PIN that changes the P-type transistor TP3 from the off-state to the on-state at t6, which is an end timing of the first period, and changes the P-type transistor TP3 from the on-state to the off-state at t7, which is a start timing of the second period. In other words, the first signal PIN is a signal that is at the low level in t6 to t7 and at the high level in other periods.

Further, the logic level of the second signal NIN corresponds to the logic level of the output of the NOR circuit NO1. Thus, the signal generator circuit 165 generates the second signal NIN that changes the N-type transistor TN3 from the on-state to the off-state at t5, which is a start timing of the first period, and changes the N-type transistor TN3 from the off-state to the on-state at t8, which is an end timing of the second period. In other words, the second signal NIN is a signal that is at the low level in t5 to t8 and at the high level in other periods.

When the P-type transistor TP3 is in the off-state and the N-type transistor TN3 is in the on-state, the output terminal TSQAj is coupled to the low potential side power supply VSS, and thus the switch signal SELAj is inactive. When the P-type transistor TP3 is in the on-state and the N-type transistor TN3 is in the off-state, the output terminal TSQAj is coupled to the high potential side power supply VDD, and thus the switch signal SELAj is active. When both the P-type transistor TP3 and the N-type transistor TN3 are in the off-state, the output terminal TSQAj is not coupled to either the high potential side power supply VDD or the low potential side power supply VSS, and thus the output terminal TSQAj is set to the high impedance state.

By using the j-th switch signal output unit 163-j in the configuration illustrated in FIG. 11, it is possible to set the output terminal TSQAj to the high impedance state in the transition period of the voltage level of the switch signal SELAj.

4. Modified Examples

Hereinafter several modified examples are described.

4.1 Modified Example of Switch Signal Output Unit

As long as the j-th switch signal output unit 163-j can set the output terminal TSQAj to the high impedance state in the transition period of the voltage level of the switch signal SELAj, the configuration is not limited to the configuration in FIG. 11.

Figure 13:
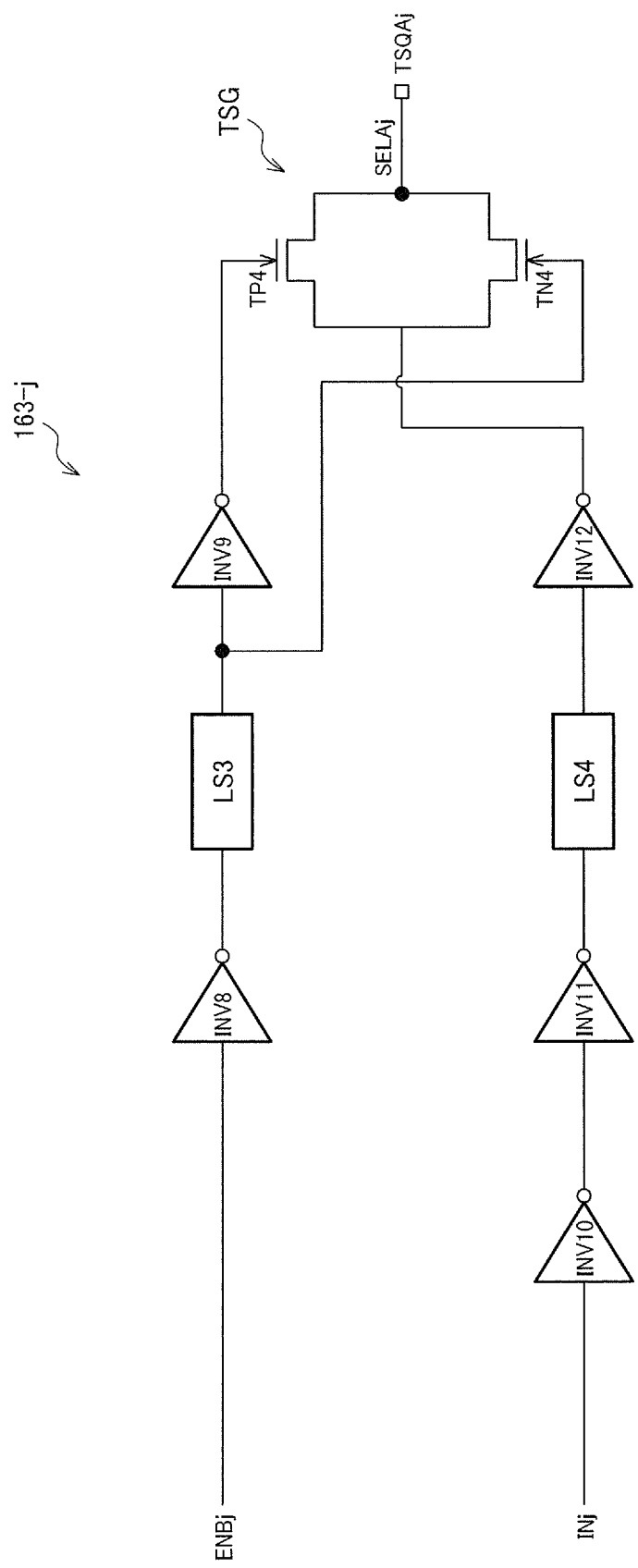
FIG. 13 illustrates a configuration example of the switch signal output unit.

FIG. 13 is an explanatory diagram of another configuration of the j-th switch signal output unit 163-j. The j-th switch signal output unit 163-j in FIG. 13 includes inverters INV8 to INV12, level shifters LS3 and LS4, and a transfer gate TSG. The level shifters LS3 and LS4 shift the voltage level and invert the signal. The transfer gate TSG in FIG. 13 is a complementary metal-oxide-semiconductor (CMOS) transfer gate including a P-type transistor TP4 and an N-type transistor TN4.

As illustrated in FIG. 13, the transfer gate TSG of the j-th switch signal output unit 163-j is a switch in which on/off is controlled based on active/inactive of the control signal ENBj. When the transfer gate TSG is on, the j-th switch signal output unit 163-j outputs a signal based on the input signal INj as the switch signal SELAj. When the transfer gate TSG is off, the j-th switch signal output unit 163-j sets the output terminal TSQAj to the high impedance state.

Figure 14:
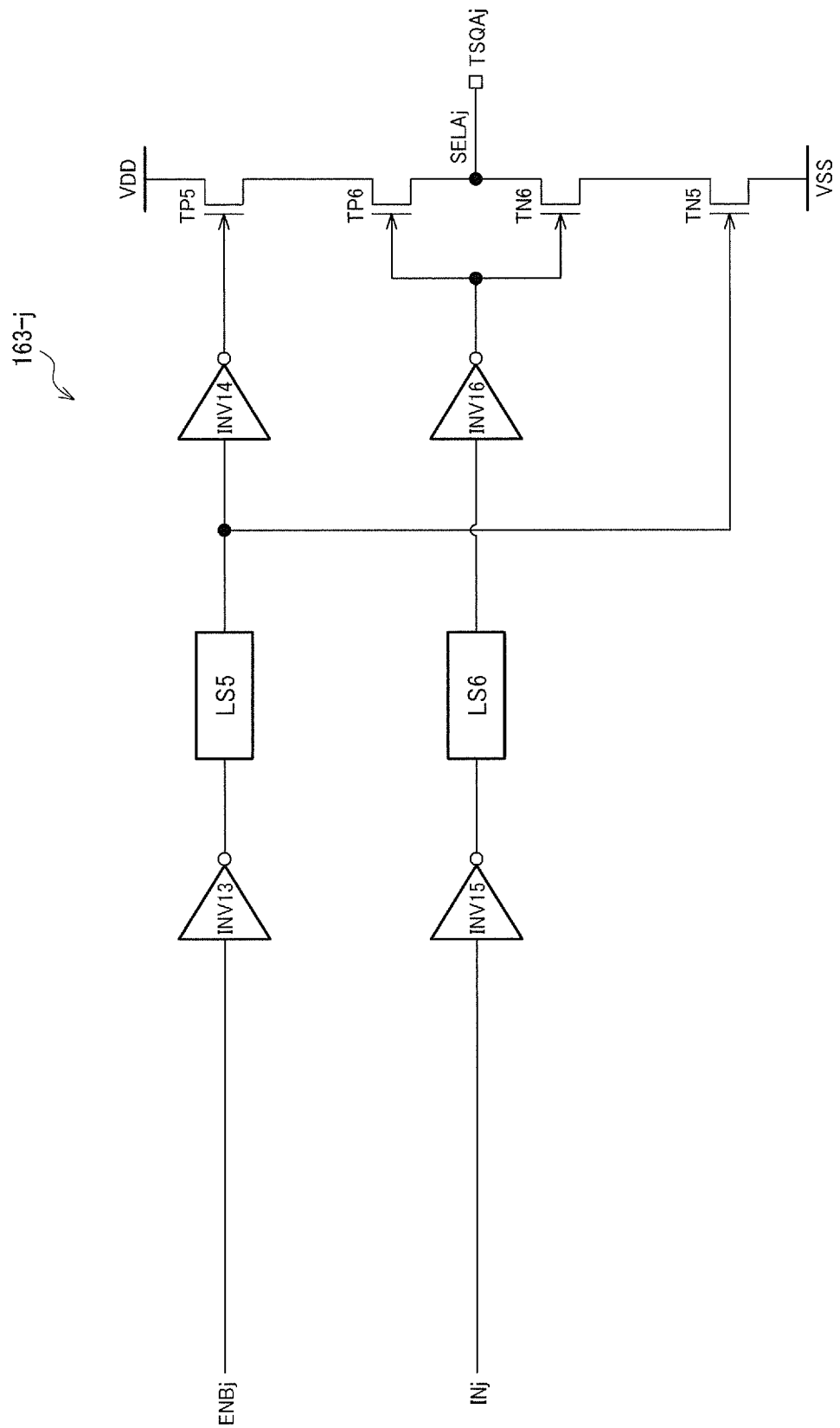
FIG. 14 illustrates a configuration example of the switch signal output unit.

FIG. 14 is an explanatory diagram of yet another configuration of the j-th switch signal output unit 163-j. The j-th switch signal output unit 163-j in FIG. 14 includes inverters INV13 to INV16, level shifters LS5 and LS6, P-type transistors TP5 and TP6, and N-type transistors TN5 and TN6.

An inverted signal of the control signal ENBj is input to a gate of the P-type transistor TP5, and the control signal ENBj is input to a gate of the N-type transistor TN5. The P-type transistor TP5 and the N-type transistor TN5 are both turned on when the control signal ENBj is inactive, and are both turned off when the control signal ENBj is active. Here, "inactive" corresponds to a high level, and "active" corresponds to a low level. That is, when the control signal ENBj is active, the output terminal TSQAj is not coupled to either the high potential side power supply VDD or the low potential side power supply VSS, and is thus in the high impedance state.

On the other hand, when the control signal ENBj is inactive, the P-type transistor TP6 is coupled to the high electric potential side power supply VDD, and the N-type transistor TN6 is coupled to the low electric potential side power supply VSS. That is, the j-th switch signal output unit 163-j outputs a signal corresponding to the input voltage level of the input signal as the switch signal SELAj.

4.2 Configuration Example of Second Switch Signal Output Circuit

The first switch signal output circuit 161 was described above. By setting one of the output terminal group TSQA1 to TSQA8 of the first switch signal and the output terminal group TSQB1 to TSQB8 of the second switch signal to the high impedance state in the transition period of the switch signal, it is possible to suppress the occurrence of a short-circuit state. That is, when the output terminal group of the first switch signal can be set to the high impedance state, the second switch signal output circuit 162 does not need to set the output terminal group TSQB1 to TSQB8 to the high impedance state.

In this case, the switch signal output unit included in the second switch signal output circuit 162 may have a configuration in which the control signal ENB is not input, in the same manner as in the technique in the related art. That is, the switch signal output unit included in the second switch signal output circuit 162 outputs buffered and level-shifted signals of the input signals IN as the second switch signal group SELB1 to SELB8.

Or, the switch signal output unit included in the second switch signal output circuit 162 may have a configuration that is the same as in FIG. 11, FIG. 13, or FIG. 14, and a configuration in which the control signal ENB, which is inactive, is input. In this case, because the control signal ENBj is inactive in the transition period of the switch signal as well, the second switch signal output circuit 162 does not set the output terminal group to the high impedance state.

Alternatively, the switch signal output circuit that sets the output terminal group in the high impedance state may be configured to be switchable in accordance with timing. That is, in a given period, the first switch signal output circuit 161 sets the output terminal group TSQA1 to TSQA8 to the high impedance state and the second switch signal output circuit 162 does not set the output terminal group TSQB1 to TSQB8 to the high impedance state in the transition period of the switch signals of the first switch signal group. Then, in a period different from the given period, the second switch signal output circuit 162 sets the output terminal group SQB1 to TSQB8 to the high impedance state and the first switch signal output circuit 161 does not set the output terminal group TSQA1 to TSQA8 to the high impedance state in the transition period of the switch signals of the second switch signal group.

Further, the configuration may be such that the switch signal output circuit that sets the output terminal group to the high impedance state differs in accordance with the switch signal line serving as the output destination of the switch signal. For example, for the switch signal line SWL1, the first switch signal output circuit 161 sets the output terminal TSQA1 to the high impedance state, and the second switch signal output circuit 162 does not set the output terminal TSQB1 to the high impedance state. For the switch signal line SWL2, the second switch signal output circuit 162 sets the output terminal TSQB2 to the high impedance state, and the first switch signal output circuit 161 does not set the output terminal TSQA2 to the high impedance state. The same applies to the switch signal lines SWL3 to SWL8. In this way, it is possible to flexibly set the output terminal on either side to the high impedance state.

5. Electro-Optical Device and Electronic Apparatus

Figure 15:
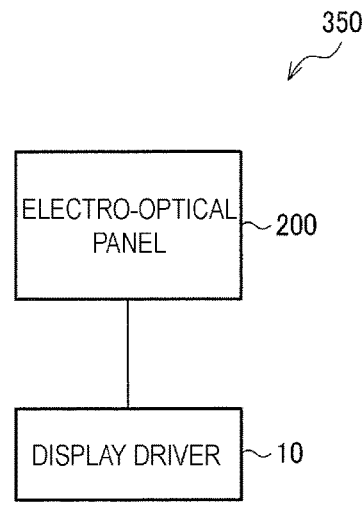
FIG. 15 illustrates a configuration example of an electro-optical device.

FIG. 15 illustrates a configuration example of an electro-optical device 350 including the display driver 10. The electro-optical device 350 includes the display driver 10 and the electro-optical panel 200. The electro-optical panel 200 includes the demultiplexer circuit DMX, the pixel area 210, and the switch signal line group SWL1 to SWL8, as illustrated in FIG. 2. The pixel area 210 is an area provided with the data lines SL11 to SL18, . . . SLN1 to SLN8, the scanning lines GL1 to GLM, and a plurality of pixels.

The electro-optical panel 200 is, for example, an active matrix type liquid crystal display panel. For example, the display driver 10 is mounted on a flexible substrate, the flexible substrate is coupled to the electro-optical panel 200, and the image-signal output terminals of the display driver 10 and the image-signal input terminals of the electro-optical panel 200 are coupled via wirings formed on the flexible substrate. Alternatively, the display driver 10 may be mounted on a rigid substrate, the rigid substrate may be coupled to the electro-optical panel 200 via a flexible substrate, and the image signal output terminals of the display driver 10 and the image signal input terminals of the electro-optical panel 200 may be coupled via wirings formed on the flexible substrate.

Figure 16:
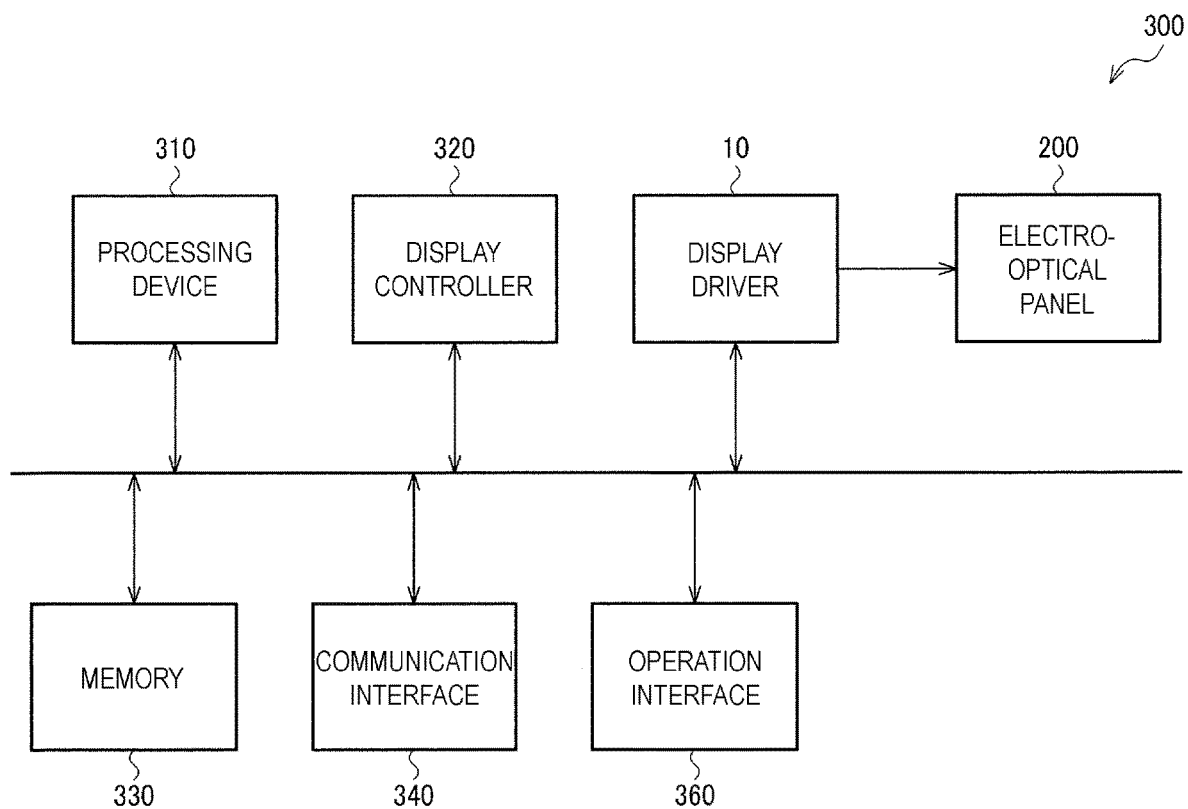
FIG. 16 illustrates a configuration example of an electronic apparatus.

FIG. 16 illustrates a configuration example of an electronic apparatus 300 including the display driver 10. The electronic apparatus 300 includes a processing device 310, a display controller 320, the display driver 10, the electro-optical panel 200, a memory 330, a communication interface 340, and an operation interface 360. Specific examples of the electronic apparatus 300 include various electronic apparatuses such as, for example, panel devices including meter panels and the like, vehicle-mounted devices including car navigation systems and the like, projectors, head-mounted displays, printing apparatuses, mobile information terminals, portable game terminals, robots, and information processing devices.

The operation interface 360 is a user interface for receiving various operations from a user. For example, the operating unit 360 is a button, a mouse, a keyboard, a touch panel mounted on the electro-optical panel 200, or the like. The communication interface 340 is a data interface for inputting and outputting image data and control data. The communication interface 340 is, for example, a wireless communication interface, such as a wireless LAN interface or a near field communication interface, or a wired communication interface, such as a wired LAN interface or a USB interface. The memory 330, for example, stores data input from the communication interface 340 or functions as a working memory for the processing device 310. The memory 330 is, for example, a memory, such as a random access memory (RAM) or read only memory (ROM), a magnetic storage device, such as a hard disk drive (HDD), or an optical storage device, such as a compact disc (CD) drive or a digital versatile disc (DVD) drive. The display controller 320 processes image data input from the communication interface 340 or stored in the memory 330, and transfers the processed image data to the display driver 10. The display driver 10 displays an image on the electro-optical panel 200 based on the image data transferred from the display controller 320. The processing device 310 carries out control processing for the electronic apparatus 300, various types of signal processing and the like. The processing device 310 is, for example, a processor, such as a CPU or an MPU, or an application-specific integrated circuit (ASIC).

For example, when the electronic apparatus 300 is a projector, the electronic apparatus 300 further includes a light source and an optical system. The optical system is, for example, a lens, a prism, a mirror, or the like. In the case where the electro-optical panel 200 is of a transmissive type, the optical device makes light from the light source incident to the electro-optical panel 200, and makes the light transmitted through the electro-optical panel 200 to be projected on a screen. In the case where the electro-optical panel 200 is of a reflective type, the optical device makes light from the light source incident to the electro-optical panel 200, and makes the light reflected at the electro-optical panel 200 to be projected on a screen.

An aspect of the disclosure is related to a display driver including a driving circuit provided with first to N-th drive units configured to output first to N-th image signals to first to N-th image signal lines coupled to first to N-th demultiplexers of a demultiplexer circuit of an electro-optical panel, N being an integer of 2 or greater, a first switch signal output circuit configured to output a first switch signal group to one end of a switch signal line group coupled to the first to N-th demultiplexers of the electro-optical panel, and a second switch signal output circuit configured to output a second switch signal group to the other end of the switch signal line group. An i-th drive unit of the first to N-th drive units of the driving circuit is configured to output, to an i-th image signal line of the first to N-th image signal lines, an i-th image signal obtained by time-division multiplexing a plurality of image signals corresponding to a plurality of data lines of the electro-optical panel, i being an integer of $1 \leq i \leq N$. An i-th demultiplexer of the first to N-th demultiplexers includes a plurality of switching elements coupled to the switch signal line group, and is configured to distribute each of the plurality of image signals time-division multiplexed into the i-th image signal to a corresponding data line among the plurality of data lines. The first switch signal output circuit is configured to set an output terminal group of the first switch signal group to a high impedance state in a transition period of a voltage level of a switch signal of the first switch signal group.

According to the aspect of the disclosure, the display driver is configured to input a switch signal from both ends of the switch signal line group. In this way, stable switch signals can be input even when the electro-optical panel has advanced high resolution and high speed driving. Further, in the transition period of the voltage level of the switch signal, the first switch signal output circuit sets the output terminal group of the first switch signal group to the high impedance state. In this way, even when the timings of the two switch signals do not match, it is possible to suppress the flow of an abnormal current.

According to an aspect of the disclosure, the first switch signal output circuit may be configured to set the output terminal group of the first switch signal group to the high impedance state in a first transition period when a voltage level of a switch signal of the first switch signal group transitions from a first voltage level to a second voltage level, and in a second transition period when a voltage level of a switch signal of the first switch signal group transitions from the second voltage level to the first voltage level.

In this way, it is possible to appropriately set the output terminal group to the high impedance state in any transition period of transition from the first voltage level to the second voltage level and of transition from the second voltage level to the first voltage level.

According to an aspect of the disclosure, the second switch signal output circuit may be configured to transition a voltage level of a switch signal of the second switch signal group from the first voltage level to the second voltage level in the first transition period of the first switch signal output circuit, and transition a voltage level of a switch signal of the second switch signal group from the second voltage level to the first voltage level in the second transition period of the first switch signal output circuit.

In this way, the voltage level of the switch signal of the output terminal coupled to the other side transitions in the period in which the output terminal coupled to one side of the switch signal line is in the high impedance state. As a result, the occurrence of a short-circuit state can be suppressed.

According to an aspect of the disclosure, the first switch signal output circuit may include first to K-th, K being an integer of 2 or greater, switch signal output units configured to output first to K-th switch signals constituting the first switch signal group to first to K-th output terminals constituting the output terminal group, and a j-th, j being an integer of $1 \leq j \leq K$, switch signal output unit of the first to K-th switch signal output units may be configured to set the j-th output terminal of the first to K-th output terminals to the high impedance state in the transition period.

In this way, it is possible to appropriately set each output terminal included in the output terminal group to the high impedance state.

According to an aspect of the disclosure, the j-th switch signal output unit may be configured to receive an input signal for generating a j-th switch signal, and a control signal. The control signal may be active during a first period from a timing when the input signal changes from a first input voltage level to a second input voltage level, and active during a second period from a timing when the input signal changes from the second input voltage level to the first input voltage level. The j-th switch signal output unit may be configured to set the j-th output terminal to the high impedance state in the first period and the second period.

In this way, it is possible to appropriately set each output terminal included in the output terminal group to the high impedance state based on the control signal and the input signal.

According to an aspect of the disclosure, the j-th switch signal output unit may include a buffer circuit including a P-type transistor provided between a high electric potential side power supply and the j-th output terminal, and an N-type transistor provided between the j-th output terminal and the low potential side power supply, and a signal generator circuit configured to generate a first signal input to the P-type transistor and a second signal input to the N-type transistor based on the input signal and the control signal.

In this way, by inputting signals based on the control signal and the input signal into the P-type transistor and the N-type transistor provided between the high electric potential side power supply and the low potential side power supply, it is possible to set the output terminal to the high impedance state.

According to an aspect of the disclosure, the signal generator circuit may be configured to generate the first signal configured to change the P-type transistor from an off-state to an on-state at an end timing of the first period, and change the P-type transistor from an on-state to an off-state at a start timing of the second period, and generate the second signal configured to change the N-type transistor from an on-state to an off-state at a start timing of the first period, and change the N-type transistor from an off-state to an on-state at an end timing of the second period.

In this way, it is possible to set the output terminal to the high impedance state in the appropriate period using the P-type transistor and the N-type transistor.

Another aspect of the disclosure relates to an electro-optical device including the display driver described in any one of the aspects above, and the electro-optic panel driven by the display driver. The electro-optical panel includes the demultiplexer circuit, a pixel area provided with the data line, a scanning line, and a plurality of pixels, and the switch signal line group.

Yet another aspect of the disclosure is related to an electronic apparatus including the display driver described in any of the aspects above.

Although some embodiments have been described in detail above, those skilled in the art will understand that many modified examples can be made without substantially departing from the novel matter and effects of the disclosure. All such modified examples are thus included in the scope of the disclosure. For example, terms in the descriptions or drawings given even once along with different terms having identical or broader meanings can be replaced with those different terms in all parts of the descriptions or drawings. All combinations of the embodiments and modified examples are also included within the scope of the disclosure. Furthermore, the configurations and operations of the display driver, the electro-optical device, and the electronic apparatus are not limited to those described in the embodiments, and various modifications are possible.

What is claimed is:

1. A display driver comprising:
a driving circuit including first to N-th drive units configured to output first to N-th image signals to first to N-th image signal lines coupled to first to N-th demultiplexers of a demultiplexer circuit of an electro-optical panel, N being an integer of 2 or greater;
a first switch signal output circuit configured to output a first switch signal group to one end of a switch signal line group coupled to the first to N-th demultiplexers of the electro-optical panel; and
a second switch signal output circuit configured to output a second switch signal group to the other end of the switch signal line group, wherein
an i-th drive unit of the first to N-th drive units of the driving circuit is configured to output, to an i-th image signal line of the first to N-th image signal lines, an i-th image signal obtained by time-division multiplexing a plurality of image signals corresponding to a plurality of data lines of the electro-optical panel, i being an integer of 1 to N,
an i-th demultiplexer of the first to N-th demultiplexers includes a plurality of switching elements coupled to the switch signal line group, and is configured to distribute each of the plurality of image signals time-division multiplexed into the i-th image signal to a corresponding data line among the plurality of data lines, and
the first switch signal output circuit is configured to set an output terminal group of the first switch signal group to a high impedance state in a transition period of a voltage level of a switch signal of the first switch signal group.

2. The display driver according to claim 1, wherein
the first switch signal output circuit is configured to set the output terminal group of the first switch signal group to the high impedance state in a first transition period when a voltage level of a switch signal of the first switch signal group transitions from a first voltage level to a second voltage level, and in a second transition period when a voltage level of a switch signal of the first switch signal group transitions from the second voltage level to the first voltage level.

3. The display driver according to claim 2, wherein
the second switch signal output circuit is configured to transition a voltage level of a switch signal of the second switch signal group from the first voltage level to the second voltage level in the first transition period of the first switch signal output circuit, and transition a voltage level of a switch signal of the second switch signal group from the second voltage level to the first voltage level in the second transition period of the first switch signal output circuit.

4. The display driver according to claim 1, wherein
the first switch signal output circuit includes first to K-th switch signal output units configured to output first to K-th switch signals constituting the first switch signal group to first to K-th output terminals constituting the output terminal group, and
a j-th switch signal output unit of the first to K-th switch signal output units is configured to set a j-th output terminal of the first to K-th output terminals to the high impedance state in the transition period, K being an integer of 2 or greater, and j being an integer from 1 to K.

5. The display driver according to claim 4, wherein
the j-th switch signal output unit is configured to receive an input signal for generating a j-th switch signal, and a control signal,
the control signal is active during a first period from a timing when the input signal changes from a first input voltage level to a second input voltage level, and active during a second period from a timing when the input signal changes from the second input voltage level to the first input voltage level, and
the j-th switch signal output unit is configured to set the j-th output terminal to the high impedance state in the first period and the second period.

6. The display driver according to claim 5, wherein
the j-th switch signal output unit includes
a buffer circuit including a P-type transistor provided between a high electric potential side power supply and the j-th output terminal, and an N-type transistor provided between the j-th output terminal and a low potential side power supply, and
a signal generator circuit configured to generate a first signal input to the P-type transistor and a second signal input to the N-type transistor based on the input signal and the control signal.

7. The display driver according to claim 6, wherein
the signal generator circuit is configured to
generate the first signal configured to change the P-type transistor from an off-state to an on-state at an end timing of the first period, and change the P-type transistor from an on-state to an off-state at a start timing of the second period, and
generate the second signal configured to change the N-type transistor from an on-state to an off-state at a start timing of the first period, and change the N-type transistor from an off-state to an on-state at an end timing of the second period.

8. An electronic apparatus comprising:
the display driver according to claim 1.

9. A display driver of an electro-optical panel provided with first to N-th image signal lines including an i-th image signal line, i being an integer of 1 to N, a plurality of data lines including a first data line and a second data line, first to N-th demultiplexers including an i-th demultiplexer, a first switch signal line, and a second switch signal line, the i-th demultiplexer including a first switch provided between the i-th image signal line and the first data line, and a second switch provided between the i-th image signal line and the second data line, the first switch being coupled to the first switch signal line and controlled in accordance with a voltage level of the first switch signal line, and the second switch being coupled to the second switch signal line and controlled in accordance with a voltage level of the second switch signal line, the display driver comprising:
a driving circuit including first to N-th drive units configured to output first to N-th image signals to the first to N-th image signal lines;
a first output terminal coupled to one end of the first switch signal line;
a second output terminal coupled to the other end of the first switch signal line;
a third output terminal coupled to one end of the second switch signal line;
a fourth output terminal coupled to the other end of the second switch signal line;
a first switch signal output circuit configured to output a first switching signal to the first output terminal and output a third switch signal to the third output terminal; and
a fourth switch signal output circuit configured to output a second switching signal to the second output terminal and output a fourth switch signal to the fourth output terminal, wherein
the first switch signal output circuit is configured to switch a state of the first switching signal to a first state for setting the first switch to inactive, a second state for setting the first switch to active, and a third state for setting the first output terminal to a high impedance state.

10. The display driver according to claim 9, wherein
the second switch signal output circuit is configured to switch a state of the second switching signal to a fourth state for setting the second switch to inactive, and a fifth state for setting the second switch to active and
the first switch signal output circuit is configured to switch a state of the first switching signal to the third state in a first transition period of transition from the fourth state to the fifth state, and in a second transition period of transition from the fifth state to the fourth state.

11. An electro-optical device comprising:
the display driver according to claim 1; and
the electro-optic panel driven by the display driver, wherein
the electro-optical panel includes
the demultiplexer circuit,
a pixel area provided with the data line, a scanning line, and a plurality of pixels, and
the switch signal line group.

12. An electronic apparatus comprising:
the display driver according to claim 9.

* * * * *